United States Patent Office 3,576,025
Patented Apr. 20, 1971

3,576,025
ALPHA-HYDROXYCARBOXYLIC ACID PENTA-
COORDINATE SILICON COMPLEXES
Cecil L. Frye, Midland, Mich., assignor to Dow Corning
Corporation, Midland, Mich.
No Drawing. Filed Aug. 19, 1969, Ser. No. 851,435
Int. Cl. C07d 103/04; C07f 7/04
U.S. Cl. 260—448.8     8 Claims

ABSTRACT OF THE DISCLOSURE

Alpha-hydroxycarboxylic acid pentacoordinate siilcon complexes useful as catalysts or cross-linking agents for epoxy resins are disclosed.

This invention relates to an alpha-hydroxycarboxylic acid pentacoordinate silicon complex of the general formula

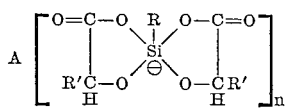

wherein

A is a cation formed from an amine,
R is an aryl radical, each
R' is a hydrogen atom or a phenyl radical, and
n is an integer equal to the number of protonated nitrogen atoms in A.

The cation A can be any cation formed from an amine. Thus, for example, A can be formed from all manner of ternary nitrogen compounds such as primary, secondary and tertiary aliphatic or aromatic amines, alkanolamines, quaternary ammonium compounds, hydrazines, guanidines and heterocyclic nitrogen compounds such as pyridines. More specific examples of such compounds include methylamine, ethylamine, propylamine, isopropylamine, butylamine, amylamine, hexylamine, decylamine, dodecylamine, octadecylamine, dimethylamine, diethylamine, methylamylamine, triethylamine, tripropylamine, diethylmethylamine, cyclohexylamine, benzyldimethylamine, aniline, dimethylaniline, toluidine, ethanolamine, diethanolamine, triethanolamine, ethylene diamine, cadaverine, hexamethylenediamine, diethylenetriamine, pyridine, guanidine, tetramethylguanidine, melamine, cinchonine, strychnine, brucine, tetramethylammonium hydroxide, trimethyl-beta-hydroxyethylammonium hydroxide, benzyltrimethylammonium hydroxide, cetyltrimethylammonium hydroxide, tallowtrimethylammonium hydroxide and 2,4,6-tri(dimethylaminomethyl)phenol. Mixtures of amines can be employed for making the complexes and in some instances may be preferred.

In the above formula R can be any aryl radical which contains from 1 to 18 carbon atoms. The R radical is attached to the silicon atom via a silicon-carbon (Si—C) bond. Thus, by way of illustration, R can be a phenyl, xenyl, naphthyl, tolyl, xylyl or a mesityl radical.

As stated above, R' is either a hydrogen atom or a phenyl radical. Both R' radicals can be the same or different.

As stated in the formula, n is an integer equal to the number of protonated nitrogen atoms in A, the cation formed from the amine. Thus it should be obvious to those skilled in the art that while a compound such as triethylamine, $(C_2H_5)_3N$, has only one nitrogen that can become protonated to form the cation $(C_2H_5)_3NH^\oplus$, in the case of polyamines such as hexamethylenediamine, $$H_2N(CH_2)_6NH_2$$

one or more of the nitrogen atoms can become protonated to form the cation $H_2N(CH_2)_6NH_3^\oplus$ with only one protonated nitrogen atom or the cation $^\oplus H_3N(CH_2)_6NH_3^\oplus$ with both of the nitrogen atoms protonated.

The complexes of this invention can be prepared by reacting (1) a silane of the formula $RSiX_3$, wherein R is as defined above and X is a hydrolyzable group such as an alkoxy group (methoxy, ethoxy, isopropoxy or butoxy), an acyloxy group (acetoxy), or a $$—OCH_2CH_2OCH_3$$

$—OCH_2CH_2OC_2H_5$ or a $—OCH_2CH_2OH$ group, or hydrolyzates thereof, (2) an alpha-hydroxycarboxylic acid such as glycolic acid or mandelic acid or mixtures thereof and (3) an amine as defined above. Ideally, these compounds are reacted in a mole ratio of (1):(2):(3) of 1:2:1. Of course, more or less of any one of the three reactants can be employed i.e., exactly stoichiometric quantities need not be employed. When the amine is employed in excess of the theoretical amount needed, complexes containing unprotonated as well as protonated amine can be formed.

Reaction of the ingredients can proceed at room temperature or one can merely heat a mixture of the three reactants. The amount of heating when used is not critical so far as is known at this time, and can vary from a simple warming of the mixture to heating the mixture at reflux. The three ingredients can be merely mixed and reacted neat, or the reaction can be carried out in a suitable solvent if so desired.

When heating is employed the time can vary considerably. For example, the time can range anywhere from about 5 to 30 minutes or more depending to some extent, of course, on the temperature employed. Generally speaking, however heating for about 15 to 30 minutes at the boiling point of the mixture is adequate to get substantially complete reaction.

While no special conditions of pressure or no special atmosphere is needed during the preparation of the complexes by the foregoing process, hypobaric pressures, hyperbaric pressures, inert atmospheres and other special conditions can be employed if so desired.

The complexes of this invention are useful as catalysts ("kickers") for accelerating epoxy resin polymerization or condensation with anhydrides, or as cross-linking agents ("hardeners") for epoxy resins which are added in larger amounts and function as one of the reactants. Thermal gravimetric analysis of these complexes indicate them to be quite labile. They exhibited sharp weight loss (release of amine) upon heating to the proper temperature range. This thermal gravimetric analysis data indicated the use of these complexes as latent curing agents (kickers and hardeners) for epoxy resins.

In order that those skilled in the art may better understand how the present invention can be practiced, the following examples are given by way of illustration and not by way of limitation. All percents referred to herein are by weight unless otherwise specified.

EXAMPLE 1

To a one-ounce vial there was added 4.0 g. (0.02 mole) of phenyltrimethoxysilane, 3.04 g. (0.04 mole) of glycolic acid, 7 g. of methanol and 2.1 g. of triethylamine. The resulting solution was heated to boiling on a hot plate. O-xylene was added to displace the methanol, and as the methanol was allowed to distill from the vial, a heavy immiscible product layer formed. Dilution with about 10 ml. of tetrahydrofuran restored miscibility and upon chilling the resulting solution deposited at 77% yield of

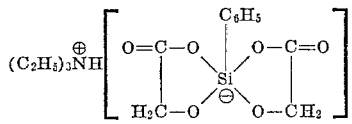

which was then recrystallized from tetrahydrofuran and evacuated free of volatiles. The product had a melting point of 111–113° C. Analysis of the product showed it contained 54.1% carbon, 7.04% hydrogen and a neutral equivalent of 355 as compared to theoretical values of 53.8% carbon, 7.11% hydrogen and a neutral equivalent of 355.

EXAMPLE 2

To a one-ounce vial there was added 4.0 g. (0.02 mole) of phenyltrimethoxysilane, 3.04 g. (0.04 mole) of glycolic acid, 1.2 g. (0.01 mole) of hexamethylenediamine, 6.5 g. of acetonitrile and 10 ml. of methanol. After heating briefly to the boiling point on a hot plate and then cooling to room temperature, the large amount of crystalline product which formed was filtered, washed well with methanol, and evacuated to constant weight of obtain 3.8 g. (61% yield) of

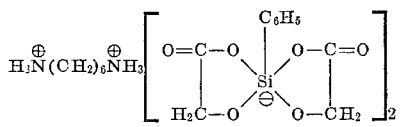

which had a melting point of 202–205° C. A second crop of 1.5 g. of the product was collected from the filtrate bringing the yield to 85%. Analysis of the product showed it contained 50.0% carbon, 5.77% hydrogen, 9.0% silicon and a neutral equivalent of 312 as compared to theoretical values of 49.1% carbon, 5.70% hydrogen, 8.7% silicon and a neutral equivalent of 317. The infrered spectrum showed a well defined ester type carbonyl absorption at 5.94μ which is consistent with the extracoordinate structure shown above as opposed to the formation of a tetracoordinate structure containing a carboxylate salt functionality.

EXAMPLE 3

To a one-ounce vial there was added in the following order, 4.00 g. (0.0204 mole) of phenyltrimethoxysilane, 3.10 g. (0.048 mole) of glycolic acid, 4 ml. of acetonitrile and 2.73 g. (0.0204 mole) of benzyldimethylamine, which mixture exothermed. The mixture was heated to 80° C. on a hot plate and then placed in a refrigerator after which a crystalline deposit was formed. These crystals were isolated and then evacuated to dryness at room temperature. The resulting product

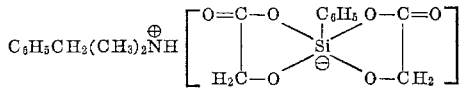

had a neutral equivalent of 387 as compared to a theoretical value of 389.

EXAMPLE 4

To a one-ounce vial there was added 3.84 g. (0.0520 mole) of glycolic acid, then 5.14 g. (0.0260 mole) of phenyltrimethoxysilane and finally 1.90 g. (0.0260 mole) of n-butylamine. After shaking, the reactants assumed one phase. There was a considerable exotherm during shaking. The neat solution was heated for about 30 minutes and then put in a freezer overnight whereupon a crystalline product was formed. The crystals were washed with hexane and evacuated, then recrystallized from acetonitrile and evacuated to dryness. A 66:4% yield (5.64 g.) of

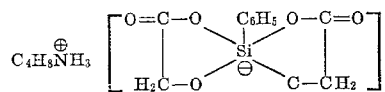

was obtained. This product was found to have a neutral equivalent of 314 as compared to a theoretical value of 327. The infrared spectrum was consistant with the above structure.

EXAMPLE 5

To a 250 ml. suction flask there was added 4 g. (0.020 mole) of phenyltrimethoxysilane, 6 g. (0.040 mole) of mandelic acid, 1.2 g. (0.01 mole) of hexamethylenediamine and 25 cc. of acetonitrile, which resulted in an exotherm. The resulting mixture was heated briefly on a hot plate which resulted in the deposition of a white crystalline solid. This crystalline material was washed with hot acetonitrile, then with tetrahydrofuran and finally with hexane before evacuating to constant weight. An 84% yield (7.8 g.) of

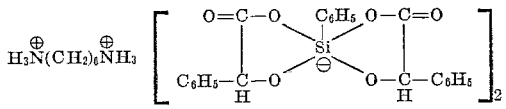

was obtained. This product had a neutral equivalent of 463 as compared to a theoretical value of 464. The infrared spectrum was consistent with above structure.

EXAMPLE 6

When the silanes, and amines indicated below are reacted with glycolic acid employing the process of the preceding examples the indicated products are obtained.

| Silane | Amine | Product |
|---|---|---|
| $C_6H_5C_6H_4Si(OCH_3)_3$ | $H_2N(CH_2)_6NH_2$ | $H_3\overset{\oplus}{N}(CH_2)_6\overset{\oplus}{N}H_3$ $\begin{bmatrix} & & C_6H_4C_6H_5 & \\ O=C-O & \diagdown & \diagup & O-C=O \\ | & & Si & | \\ H_2C-O & \diagup^\ominus & \diagdown & O-CH_2 \end{bmatrix}$ |
| $CH_3C_6H_4Si(OC_3H_7)_3$ | $(C_2H_5)_3N$ | $(C_2H_5)_3\overset{\oplus}{N}H$ $\begin{bmatrix} & & C_6H_4CH_3 & \\ O=C-O & \diagdown & \diagup & O-C=O \\ | & & Si & | \\ H_2C-O & \diagup^\ominus & \diagdown & O-CH_2 \end{bmatrix}$ |
| Naphthyl-$Si(OC_2H_5)_3$ | $C_4H_9NH_2$ | $C_4H_9\overset{\oplus}{N}H_3$ $\begin{bmatrix} & & \text{naphthyl} & \\ O=C-O & \diagdown & \diagup & O-C=O \\ | & & Si & | \\ H_2C-O & \diagup^\ominus & \diagdown & O-CH_2 \end{bmatrix}$ |

EXAMPLE 7

When a mixture of glycolic and mandelic acids is substituted for the mandelic acid of Example 5, by way of illustration, there is obtained as the product

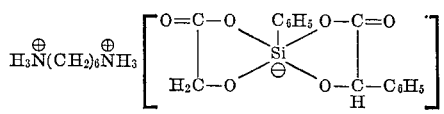

EXAMPLE 8

When the product of Example 1 is mixed with tetrabutylammonium chloride in a suitable solvent, the triethylamine chloride salt can be filtered off and then the quaternary ammonium complex indicated below recovered.

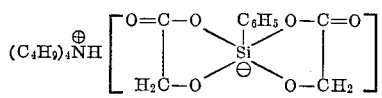

When benzyltrimethylammonium chloride is substituted for tetrabutylammonium chloride in the above process, the product obtained is

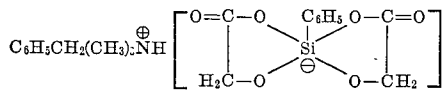

EXAMPLE 9

This example illustrates the use of the complexes of this invention as catalysts and cross-linking agents for epoxy resins. The epoxy resin used in this example (Dow Epoxy Resin 331) was a low molecular weight liquid resin prepared by the reaction of epichlorohydrin and Bisphenol-A. It had a viscosity in the range of 11,000–16,000 cps., an epoxide equivalent weight in the range of 187–193, and a specific gravity of about 1.17.

In an aluminum cup there was mixed 1.89 g. of liquid epoxy resin and 2.00 g. of trimellitic anhydride. This mixture was placed on a hot plate at 150° C. and stroked with a spatula. The mixture gelled in 3¼ minutes, the anhydride cross-linking the resin.

The above procedure was repeated except that 0.02 g. of the complex of Example 3 was also added to the mixture. The mixture gelled in 1½ minutes, the complex catalyzing the cross-linking of the resin by the anhydride.

In an aluminum cup there was mixed 1.89 g. of liquid epoxy resin, and 1.56 g. of the complex of Example 2. No anhydride was employed in this mixture. This mixture was placed on a hot plate at 150° C. and stroked with a spatula. The mixture gelled in 10¼ minutes, the complex cross-linking the resin.

That which is claimed is:

1. An alpha-hydroxycarboxylic acid pentacoordinate silicon complex of the general formula

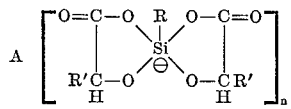

wherein

A is a cation formed from an amine,
R is an aryl radical, each
R' is a hydrogen atom or a phenyl radical, and
$n$ is an integer equal to the number of protonated nitrogen atoms in A.

2. A complex as defined in claim 1 wherein R is a phenyl radical and each R' is a hydrogen atom.
3. A complex as defined in claim 2 wherein A is formed from triethylamine.
4. A complex as defined in claim 2 wherein A is formed from hexamethylenediamine.
5. A complex as defined in claim 2 wherein A is formed from benzyldimethylamine.
6. A complex as defined in claim 2 wherein A is formed from n-butylamine.
7. A complex as defined in claim 1 wherein R is a phenyl radical and each R' is a phenyl radical.
8. A complex as defined in claim 7 wherein A is formed from hexamethylenediamine.

References Cited

UNITED STATES PATENTS

| | | | |
|---|---|---|---|
| 3,355,477 | 11/1967 | Frye | 260—448.8R |
| 3,360,525 | 12/1967 | Frye | 260—448.8RX |
| 3,455,980 | 7/1969 | Frye | 260—448.8R |

TOBIAS E. LEVOW, Primary Examiner

P. F. SHAVER, Assistant Examiner

U.S. Cl. X.R.

260—249.7, 290, 830, 448.8A